US007162273B1

(12) United States Patent
Abramov et al.

(10) Patent No.: US 7,162,273 B1
(45) Date of Patent: Jan. 9, 2007

(54) DYNAMICALLY OPTIMIZED SMART ANTENNA SYSTEM

(75) Inventors: Oleg Y. Abramov, St. Petersburg (RU); Alexander G. Kashkarov, St. Petersburg (RU); Alexander N. Kirdin, St. Petersburg (RU)

(73) Assignee: Airgain, Inc., Carlsbad, CA (US)

(*) Notice: Subject to any disclaimer, the term of this patent is extended or adjusted under 35 U.S.C. 154(b) by 380 days.

(21) Appl. No.: 09/709,758

(22) Filed: Nov. 10, 2000

(51) Int. Cl.
*H04B 1/38* (2006.01)
*H04M 1/00* (2006.01)

(52) U.S. Cl. .............................. 455/562.1; 455/277.1; 342/383

(58) Field of Classification Search ................ 455/269, 455/272, 273, 277.1, 277.2, 280, 288, 289, 455/291, 293, 561.1, 278.1, 434; 343/700 MS, 343/754, 766, 890, 898; 342/383
See application file for complete search history.

(56) References Cited

U.S. PATENT DOCUMENTS

| | | | | |
|---|---|---|---|---|
| 4,881,081 | A | 11/1989 | Yoshihara | |
| 5,117,236 | A * | 5/1992 | Chang et al. | 342/367 |
| 5,303,240 | A * | 4/1994 | Borras et al. | 370/347 |
| 5,483,676 | A * | 1/1996 | Mahany et al. | 455/67.14 |
| 5,594,460 | A | 1/1997 | Eguchi | |
| 5,697,066 | A | 12/1997 | Acampora | |
| 5,726,661 | A * | 3/1998 | Fuji | 342/359 |
| 5,873,048 | A * | 2/1999 | Yun | 455/446 |
| 6,100,843 | A | 8/2000 | Proctor | |
| 6,124,832 | A | 9/2000 | Jeon et al. | |
| 6,173,190 | B1 * | 1/2001 | Usui | 455/562.1 |
| 6,198,925 | B1 * | 3/2001 | Lee | 455/434 |
| 6,222,503 | B1 * | 4/2001 | Gietema et al. | 343/890 |
| 6,229,480 | B1 | 5/2001 | Shintani | |
| 6,229,486 | B1 * | 5/2001 | Krile | 343/700 MS |
| 6,278,405 | B1 * | 8/2001 | Ha et al. | 342/359 |
| 6,363,263 | B1 * | 3/2002 | Reudink et al. | 455/562.1 |
| 6,370,369 | B1 * | 4/2002 | Kraiem et al. | 455/277.1 |
| 6,430,421 | B1 * | 8/2002 | Kiiski et al. | 455/562.1 |
| 6,449,469 | B1 * | 9/2002 | Miyahara | 455/273 |
| 6,486,832 | B1 * | 11/2002 | Abramov et al. | 343/700 MS |
| 6,487,423 | B1 * | 11/2002 | Johansson | 455/562.1 |
| 6,522,898 | B1 * | 2/2003 | Kohno et al. | 455/562.1 |
| 6,621,454 | B1 * | 9/2003 | Reudink et al. | 342/367 |
| 6,748,216 | B1 * | 6/2004 | Lee | 455/434 |
| 7,039,441 | B1 * | 5/2006 | Reudink et al. | 455/562.1 |
| 2001/0031648 | A1 * | 10/2001 | Proctor et al. | 455/562 |

FOREIGN PATENT DOCUMENTS

| | | |
|---|---|---|
| EP | 0897230 A2 | 2/1999 |

* cited by examiner

*Primary Examiner*—Edward F. Urban
*Assistant Examiner*—Blaine J. Jackson
(74) *Attorney, Agent, or Firm*—Propopio, Cory, Hargreaves & Savitch

(57) ABSTRACT

A wireless communications network includes a plurality of wireless devices equipped with direction-agile antenna systems to allow the wireless devices to establish and maintain wireless data links with each other.

40 Claims, 9 Drawing Sheets

DYNAMICALLY OPTIMIZED SMART ANTENNA SYSTEM

BACKGROUND OF THE INVENTION

1. Field of the Invention

The present invention relates to a communications network, and more particularly, to a wireless communications network.

2. Background Art

Omni-directional antennas have been implemented in various types of mobile communications devices in a conventional wireless network, for example, a digital mobile telephone network. In addition to voice communications, attempts have been made to provide high speed data communications between various types of apparatus including, for example, desktop computers, laptop computers, servers, peripherals and power management hubs in a wireless network. Compared to voice communications, data communications typically require a large bandwidth, a very low bit error rate, and ability to communicate with multiple devices at different physical locations.

To ensure high speed transmission of data at a very low bit error rate, a relatively high signal to noise ratio (SNR) at radio frequency (RF) is required to carry the data transmitted and received by the various apparatus in a conventional wireless network. Because of the spread of RF power over all directions in space by a typical omni-directional antenna in a conventional mobile wireless device, such as a mobile telephone, communications with such devices may occur only over relatively short distances. Furthermore, in a typical mobile wireless network, the locations of at least some of the communications apparatus are not fixed with respect to each other, thereby further complicating the transmission and reception of data by different apparatus within the network.

It is desirable that high speed data links be established in a mobile wireless network with a high degree of data integrity while obviating the need for high power RF transmissions by mobile communications apparatus. Furthermore, it is desirable that high speed data links be maintained between different mobile communications apparatus in a wireless network even though the spatial locations of the apparatus may not be fixed with respect to each other.

SUMMARY OF THE INVENTION

The present invention provides a wireless network comprising a plurality of communication devices, at least one of the communication devices comprising:

an antenna capable of transmitting an electromagnetic signal in a direction having an antenna gain; and a controller connected to the antenna, the controller capable of generating a direction-selection signal to steer the electromagnetic signal to a selected direction corresponding to a high gain position in response to detecting an expected signal transmitted by another one of the communication devices.

BRIEF DESCRIPTION OF THE DRAWINGS

The present invention will be described with particular embodiments thereof, and references will be made to the drawings in which.

DETAILED DESCRIPTION

Figure 1:
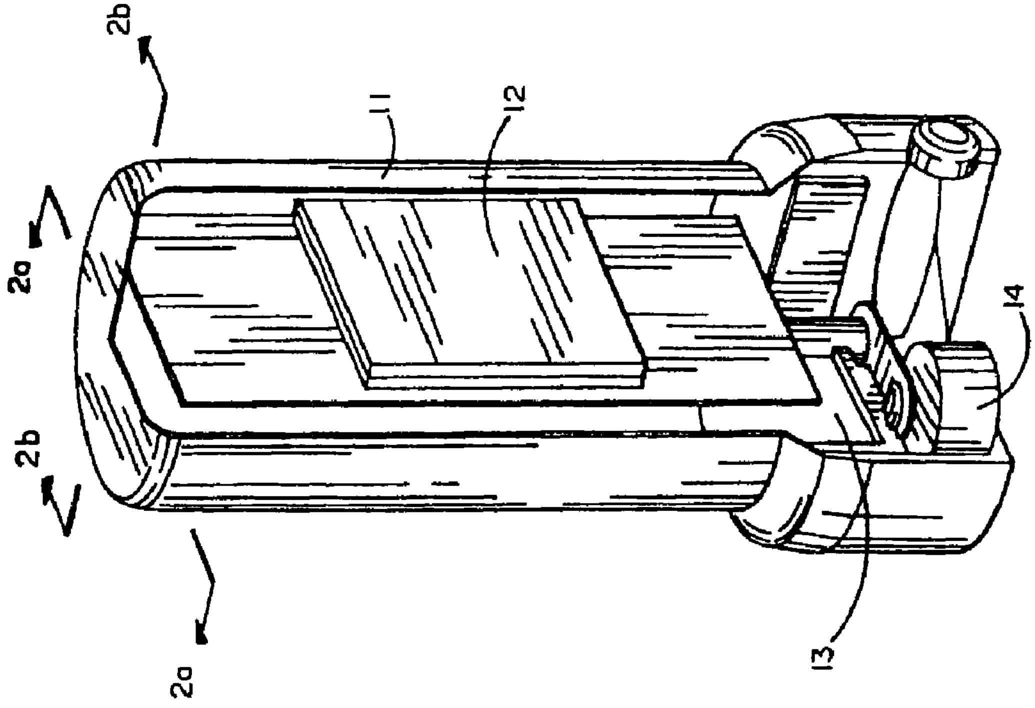
FIG. 1 is a partially cutaway perspective view of a direction-agile antenna system with mechanical beam steering in an embodiment according to the present invention.

FIG. 1 shows a partially cutaway perspective view of an embodiment of a direction-agile antenna system for use in a mobile wireless communications network. In this embodiment, the antenna system includes a mechanically steered antenna 12 enclosed within a dielectric cover 11. A motor driver 13 is connected to a motor 14 which is capable of rotating the antenna 12 to a desired direction. In an embodiment, the motor 14 is capable of rotating the antenna 12 through 360° in azimuth to scan the antenna beam in a horizontal plane. In a further embodiment, the motor driver 13 is capable of driving the antenna 12 to scan in both azimuth and elevation.

In an embodiment, the antenna 12 is a planar microstrip antenna which comprises a plurality of microstrip antenna elements capable of transmitting and receiving electromagnetic signals in a direction having a positive antenna gain. Other types of directional antennas with positive antenna gains in desired directions may also be implemented in the direction-agile antenna system within the scope of the present invention. For example, parabolic reflector antennas, cassegrain antennas, waveguide slot array antennas and phased array antennas capable of producing directional electromagnetic beam patterns may be implemented in the direction-agile antenna system. Various types of conventional antennas can be designed to produce desired beam patterns in a conventional manner apparent to a person skilled in the art.

Figure 2B:
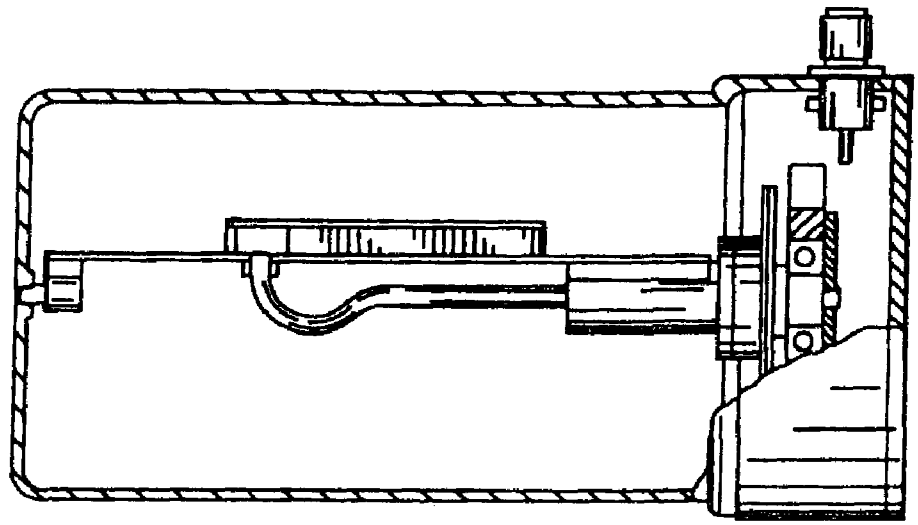
FIG. 2B is another side-sectional view of the direction-agile antenna system of FIG. 1 obtained along sectional line 2*b*—2*b;*
Figure 2A:
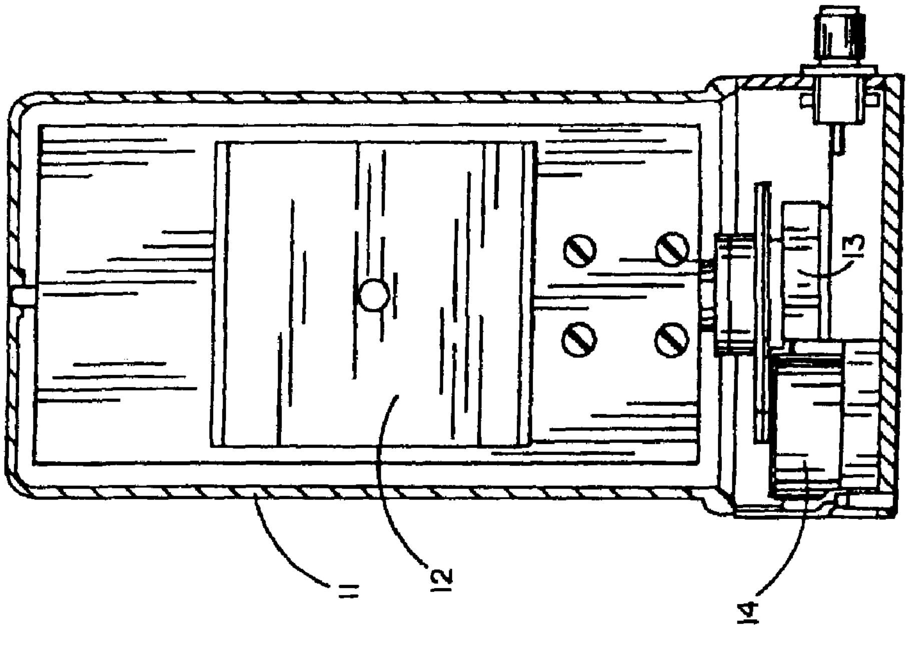
FIG. 2A is a side-sectional view of the direction-agile antenna system of FIG. 1 obtained along sectional line 2*a*—2*a;*

FIGS. 2A and 2B show side-sectional views of the direction-agile antenna system with a mechanically steered antenna of FIG. 1 obtained along sectional lines 2*a*—2*a* and 2*b*—2*b*, respectively.

Figure 3:
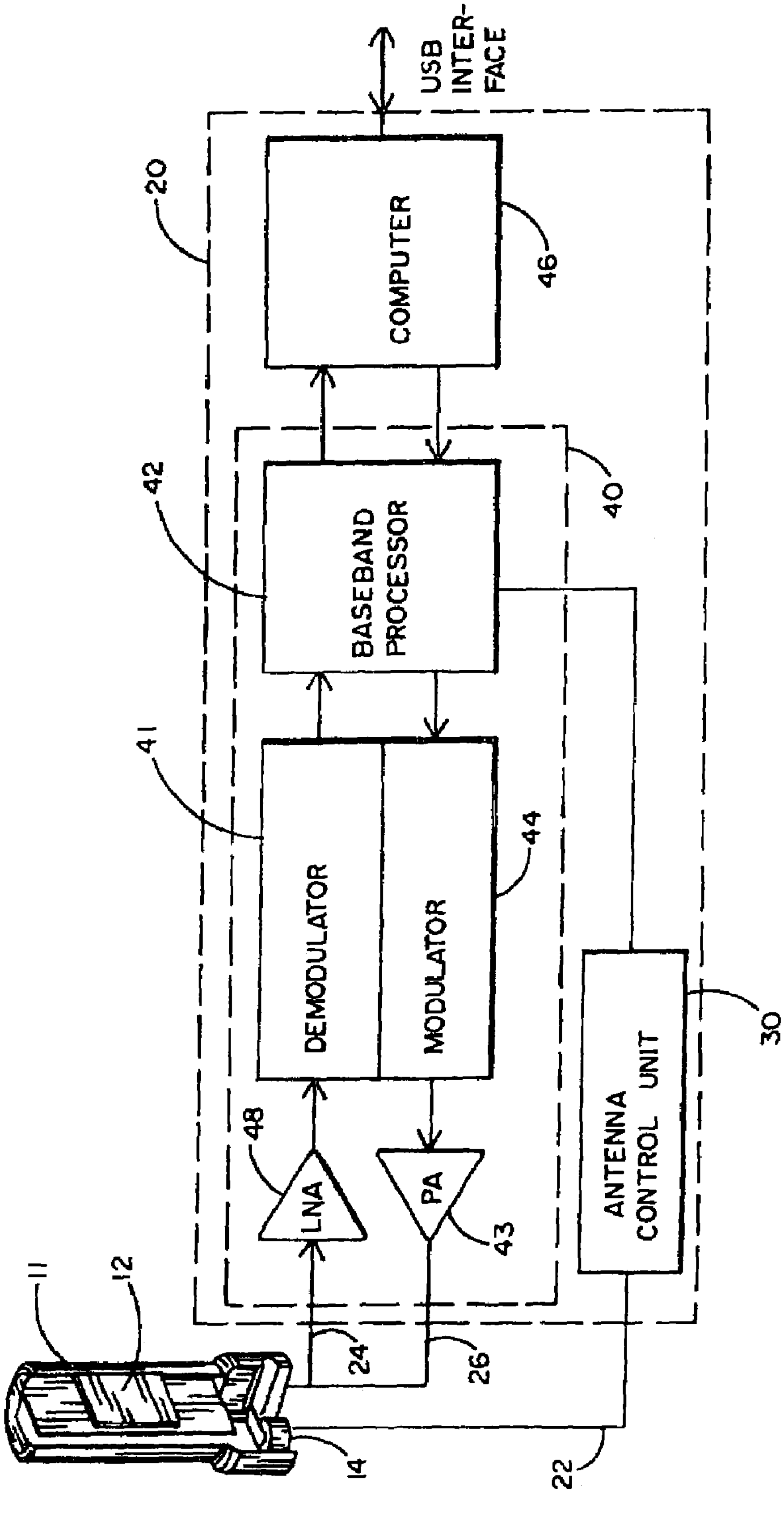
FIG. 3 is a schematic block diagram showing an embodiment of a controller with digital signal processing for the direction-agile antenna system.

FIG. 3 shows a block diagram of an embodiment of a controller for selecting the direction of electromagnetic transmission and reception by the antenna in the direction-agile antenna system. The controller 20 is capable of generating a direction-selection signal to steer the electromagnetic signal transmitted by the antenna 12 to a selected direction corresponding to a high gain position, in response to detecting an expected signal transmitted within the wireless communications network. In an embodiment, the controller 20 has a drive signal output 22 connected to a motor 14 in a mechanically steered direction-agile antenna system. Furthermore, the controller 20 has a radio frequency (RF) input 24 and an RF output 26 connected to the antenna 12.

In an embodiment, the controller 20 comprises a transceiver 40 and an antenna control unit 30. The transceiver 40, which is connected to the antenna 12 through the RF input 24 and the RF output 26, is capable of generating an antenna gain signal in response to detecting an expected signal transmitted by another wireless device within the wireless communications network. The antenna gain signal generated by the transceiver 40 is transmitted to the antenna control unit 30, which generates a direction-selection signal to steer the antenna 12 to a desired direction in response to the antenna gain signal.

In an embodiment, the transceiver 40 comprises a demodulator 41 connected to the RF input 24 to convert the received RF signal to a baseband signal. In an embodiment, the demodulator 41 converts the received RF signal to the baseband signal in multiple stages in a manner apparent to a person skilled in the art. For example, the RF signal may be first converted to an intermediate frequency (IF) signal and then demodulated into a baseband signal. To reduce the effect of noise spectrum in the received RF signal, a low noise amplifier (LNA) 48 is connected between the antenna 12 and the demodulator 41 in an embodiment.

In an embodiment, the transceiver 40 further comprises a baseband processor 42 connected to the demodulator 41 to generate the antenna gain signal which is transmitted to the antenna control unit 30. In an embodiment, the baseband processor 42 is capable of processing data transmitted and received by the direction-agile antenna system in addition to generating the antenna gain signal for steering the antenna beam to a desired direction to communicate with another wireless device within the wireless network. In this embodiment, the data transmitted and received by the direction-agile antenna system are transferred between the baseband processor 42 and a computer 46, which is capable of further transferring the data to peripherals through an interface, for example, a universal serial bus (USB) interface.

In an embodiment, the transceiver 40 further comprises a modulator 44 connected to the baseband processor 42, which generates baseband signals carrying the data to be transmitted by the direction-agile antenna system to another wireless device within the wireless network. The modulator 44 modulates the baseband signals generated by the baseband processor 42 to generate RF signals. In an embodiment, the RF signals generated by the modulator 44 are amplified by a power amplifier 43, which is connected between the modulator 44 and the antenna 12. The demodulation of RF signals into baseband signals and the modulation of baseband signals into RF signals can be performed in a conventional manner apparent to a person skilled in the art.

Figure 4:
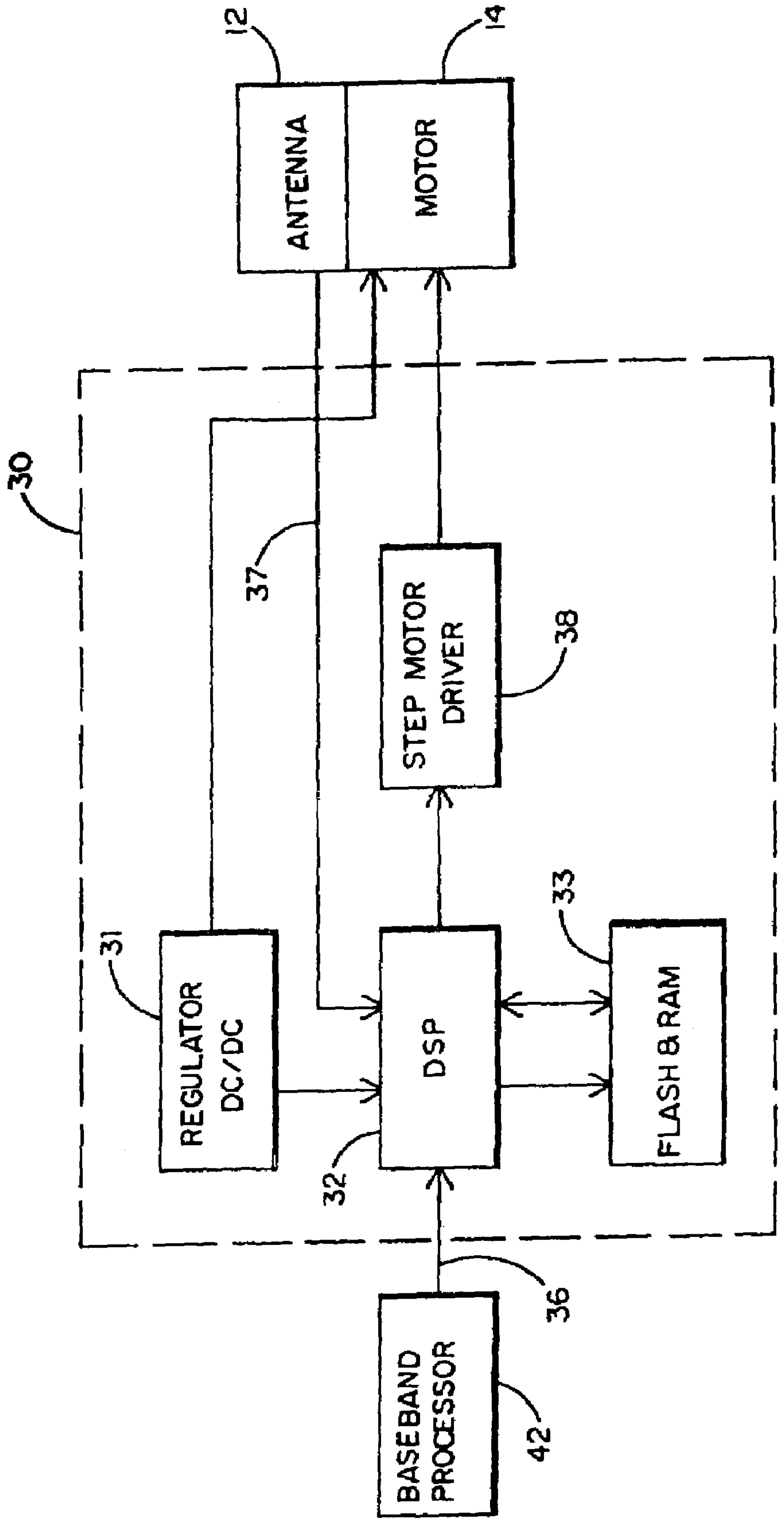
FIG. 4 is a schematic block diagram showing an embodiment of an antenna control unit in a direction-agile antenna system with mechanical beam steering.

FIG. 4 shows a block diagram of an embodiment of an antenna control unit which is applicable to a direction-agile antenna system with a mechanically steered antenna. In this embodiment, the antenna control unit 30 comprises a digital signal processor (DSP) 32 which is connected to receive the antenna gain signal from the baseband processor 42 via signal path 36. In an embodiment, the digital signal processor 32 is also connected to flash and random access memory (RAM) 33. In an embodiment, the memory 33 stores application software which embeds the algorithm for generating a direction-selection signal for the antenna. In an embodiment, the digital signal processor 32 generates the direction-selection signal based upon the instant gain of the antenna in the desired direction, the instant angle of the antenna and the parameters of the driving motor.

In an embodiment in which the direction-agile antenna is mechanically steered by a step motor, the antenna control unit 30 further comprises a step motor driver 38 connected between the digital signal processor 32 and the motor 14 for rotating the antenna 12. The motor 14 is capable of rotating the antenna 12 to the selected direction in response to the direction-selection signal received by the step motor driver 38. In a further embodiment, a DC/DC regulator 31 is connected to the digital signal processor 32 and the motor 14. In an embodiment, a feedback path 37 is provided between the antenna 12 and the digital signal processor 32 to indicate the current angular position of the antenna to the processor 32, thereby allowing the processor 32 to track the movement of the antenna with better accuracy.

Figure 5:
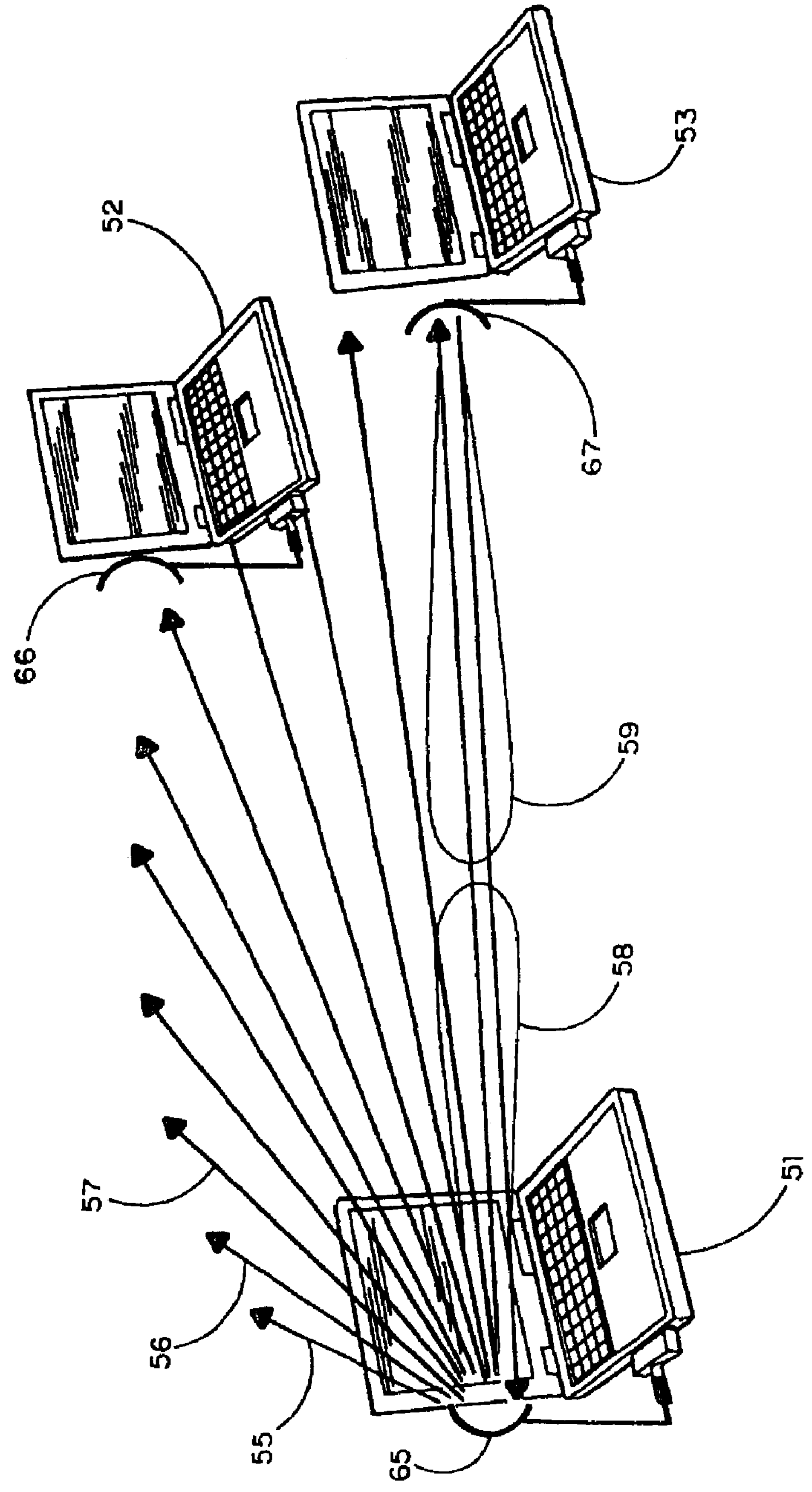
FIG. 5 is a schematic representation of a mobile wireless network having a plurality of laptop computers equipped with direction-agile antenna systems in an embodiment according to the present invention.

FIG. 5 illustrates a mobile wireless network which includes a plurality of mobile wireless devices using direction-agile antennas. In FIG. 5, three laptop computers 51, 52 and 53 are equipped with direction-agile antennas 65, 66 and 67, respectively. One of the wireless communication devices which seeks to initiate a wireless data link is called a master device, whereas another wireless communication device which responds to the request to establish the data link is called a slave device. For example, the mobile wireless communication device 51 may be a master device which seeks to establish a wireless data link with either the wireless communication device 52 or the wireless communication device 53.

The direction-agile antenna 65 of the master device 51 initially scans through successive angular positions such as those indicated by arrows 55, 56 and 57 until it arrives at a direction corresponding to the high gain position for a slave device with which a wireless data link is intended to be established. During the scanning of the direction-agile antenna 65, polling requests are transmitted repeatedly until the master device 51 receives a response to the polling request by one of the slave devices. If the slave device 52 is not the one intended to establish a wireless data link with the master device 51, for example, then the direction-agile antenna 66 of the slave device 52 does not transmit a response to the polling request.

On the other hand, if the slave device 53 is the one intended to establish a wireless data link with the master device 51, then the direction-agile antenna 67 of the slave device 53 is directed toward the direction-agile antenna 65 of the master device 51, and a response is transmitted from the slave device 53 to the master device 51 to accomplish a handshake signifying the establishment of a wireless data link between the master device 51 and the slave device 53.

When the response to the polling request is detected by the master device 51, the direction-agile antenna 65 of the master device 51 is directed toward the slave device 53, with an antenna beam pattern illustrated by the main lobe 58 of electromagnetic radiation generated by the antenna 65. In a similar manner, the direction-agile antenna 67 of the slave device 53 is directed toward the master device 51, with an antenna beam pattern illustrated by the main lobe 59 of electromagnetic radiation generated by the antenna 67.

Figure 6:
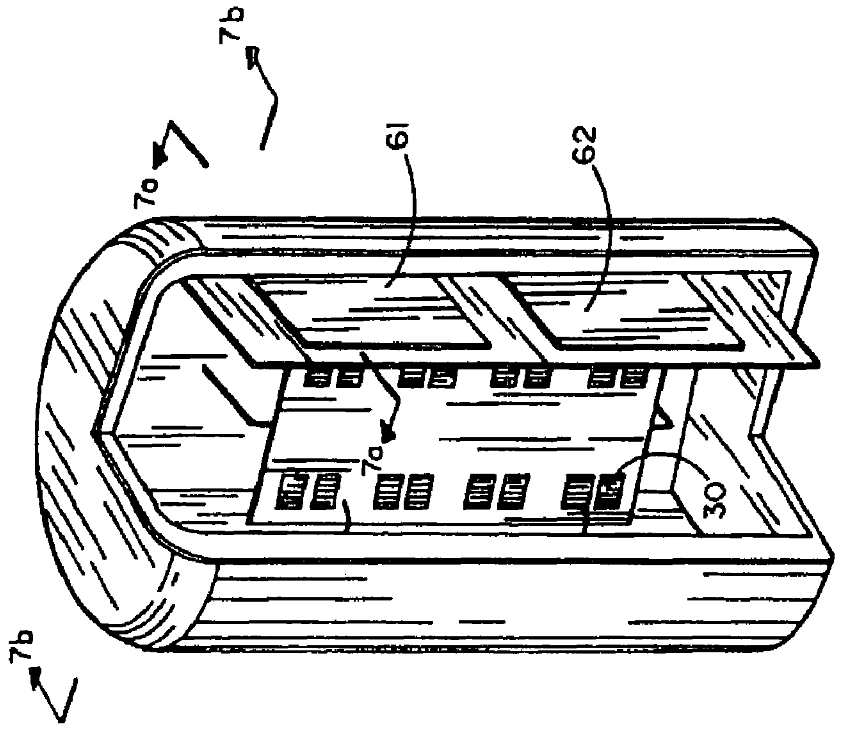
FIG. 6 shows a partially cutaway perspective view of a direction-agile antenna system with electronic beam steering in an embodiment according to the present invention.

FIG. 6 shows an embodiment of a partially cutaway perspective view of a direction-agile antenna with electronic beam scanning. In this embodiment, the antenna need not be rotated mechanically to scan the antenna beam in all directions. In the embodiment shown in FIG. 6, the electronically steered antenna comprises four antenna surfaces or planes to cover all azimuth angles, each of the antenna surfaces having a plurality of antenna elements capable of electronically steering electromagnetic signals to a selected direction in response to the direction-selection signal generated by the antenna control unit 30. In an embodiment, the antenna elements on each surface comprise an array of microstrip radiators. In an embodiment, the circuitry of the antenna control unit 30 is integrated with one of the antenna surfaces on which the arrays of microstrip radiators are disposed. In FIG. 6, for example, four antenna planes are arranged at 90° to one another, with each of the antenna planes having two arrays of antenna elements, such as arrays 61 and 62.

Figure 7B:
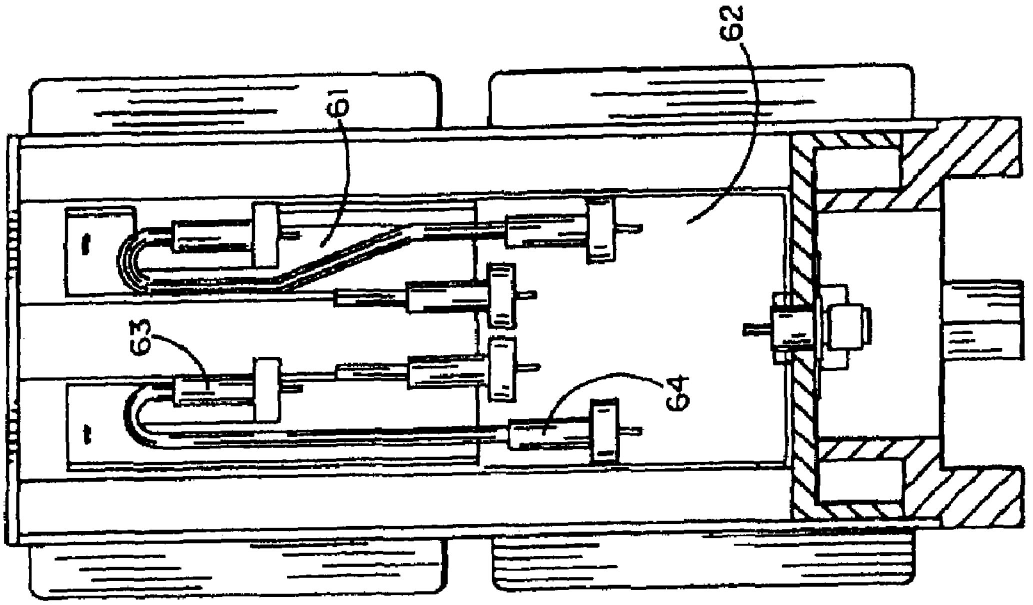
FIG. 7B is another side-sectional view of the direction-agile antenna system of FIG. 6 obtained along sectional line 7*b*—7*b* of FIG. 6.
Figure 7A:
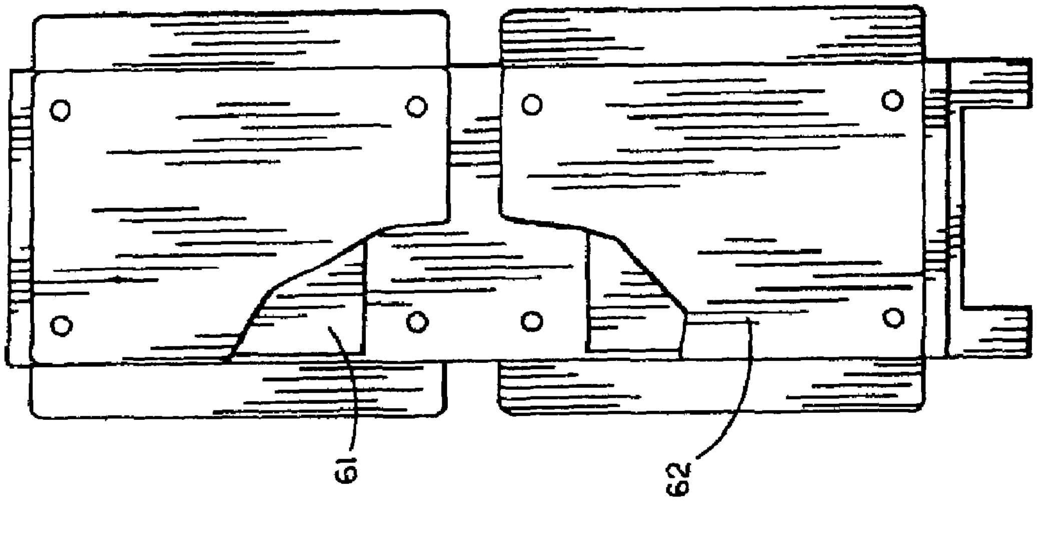
FIG. 7A is a side-sectional view of the direction-agile antenna system of FIG. 6 obtained along sectional line 7*a*—7*a* of FIG. 6.

FIGS. 7A and 7B are side-sectional views of the electronically steered direction-agile antenna of FIG. 6 obtained along sectional lines *7a*—*7a* and *7b*—*7b*, respectively. Power delivery lines 63 and 64 are provided to supply power to the antenna arrays such as antenna arrays 61 and 62 for transmitting electromagnetic signals.

Figure 8:
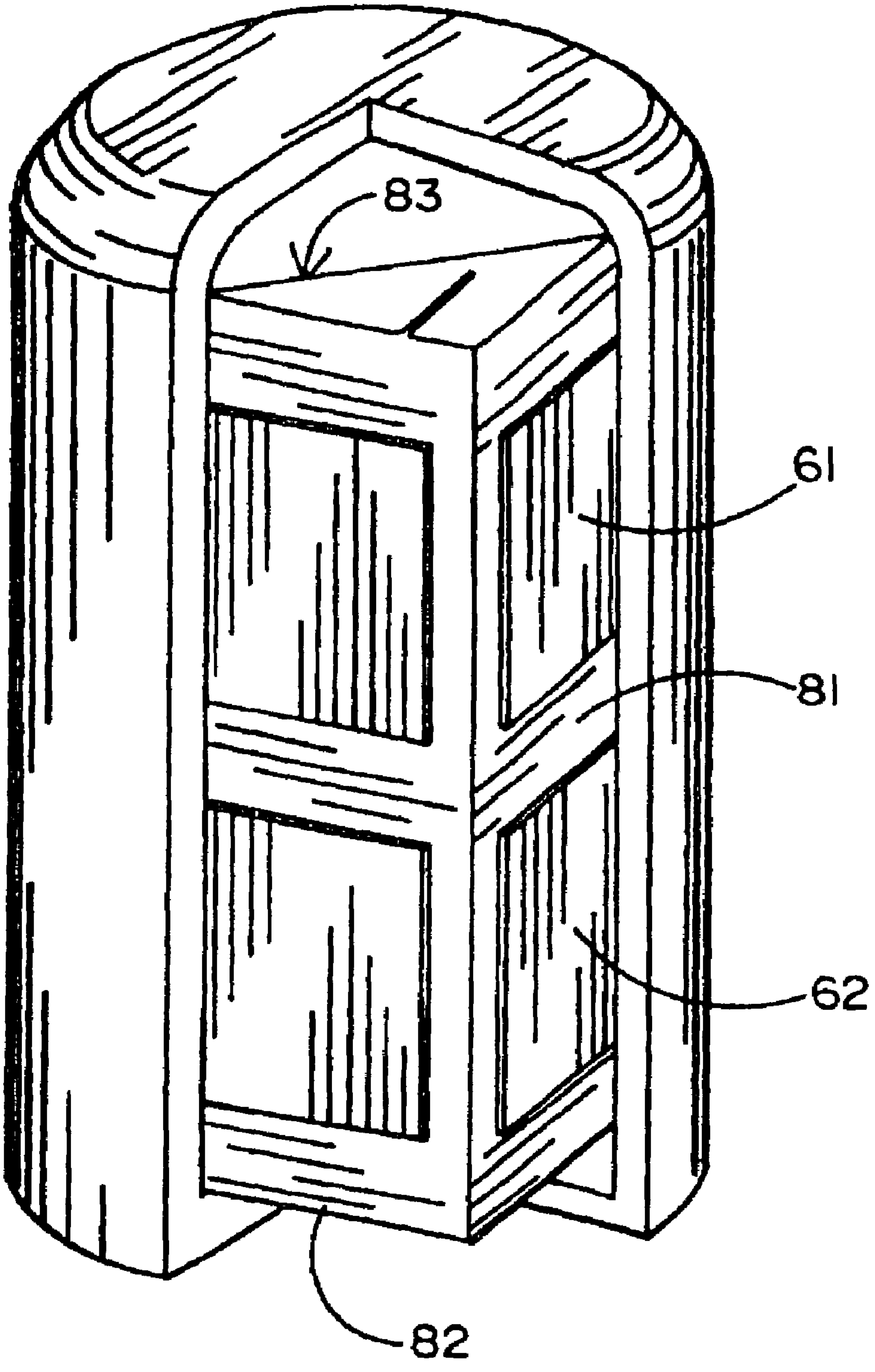
FIG. 8 is a partially cutaway perspective view of a direction-agile antenna system with electronic beam steering in another embodiment according to the present invention.

FIG. 8 shows another embodiment of a direction-agile antenna system with electronic beam steering. Three antenna surfaces 81, 82 and 83 are implemented to cover all azimuth angles. In the embodiment shown in FIG. 8, each antenna surface has two arrays of microstrip radiator elements similar to the arrangement shown in FIGS. 6, 7A and 7B and described above. In an embodiment in which a direction-agile antenna with electronic beam steering is implemented, at least some of the antenna elements are capable of being activated or switched on while other antenna elements are switched off, to allow the mobile wireless device to adjust the RF power level of transmitted electromagnetic signals.

Figure 9:
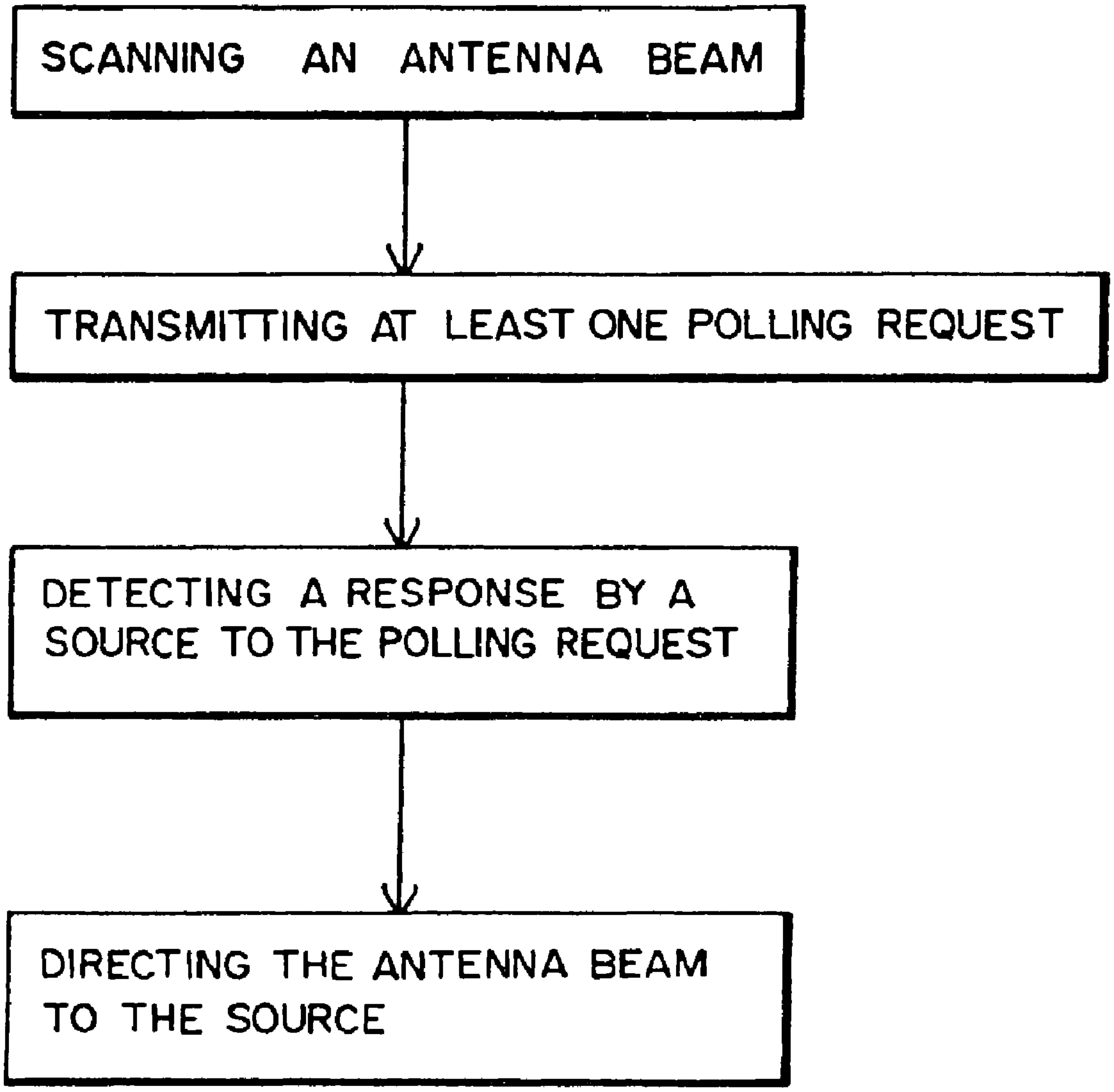
FIG. 9 is a flow chart illustrating a method of tracking a signal in a wireless network in an embodiment according to the present invention.

FIG. 9 shows a flow chart illustrating an embodiment of a method of tracking a signal in a wireless communications network by a master communications device using a direction-agile antenna system. The method generally comprises the steps of scanning an antenna beam in multiple directions, transmitting at least one polling request during the step of scanning the antenna beam, detecting a response by a source within the wireless network to the polling request, and directing the antenna beam to the source. The source which transmits a response to the polling request is a slave device that is intended to establish a wireless data link with the master device. In an embodiment in which mechanically steered direction-agile antennas are implemented, the antennas of the master and slave devices may rotate at different speeds and different angular increments which are optimized to reduce the time for establishing a wireless data link.

When the antenna of the master device is scanning over 360° in azimuth, for example, polling requests are transmitted intermittently to seek a slave device which intends to establish a wireless data link with the master device. During the scanning of the direction-agile antenna of the master device, the transceiver of the master device awaits a response by a slave device within the network. The master device determines a desired direction of the antenna beam of the master device to the slave device by detecting a beam pattern of the RF signal carrying the response transmitted by the slave device and generating an antenna gain signal based upon the RF signal transmitted by the slave device.

In an embodiment, the RF signal received by the master device is demodulated into an IF signal which is then converted into a baseband signal. The baseband signal is processed by a baseband processor to generate an antenna gain signal, which is in turn processed by the antenna control unit to generate a motor drive signal. In an embodiment in which a mechanically steered antenna is implemented, the antenna is rotated by a motor to the desired direction in response to the motor drive signal. Once the antenna beam of the master device is directed toward the slave device, the rotation of the antenna stops. In an embodiment, the position of the antenna is memorized by the antenna control unit of the master device while the master device starts to exchange data with the slave device.

In an embodiment, fine tuning is performed by the direction-agile antenna system of the master device to maximize the gain of received RF signals as soon as the wireless data link is established between the master device and the slave device. Fine tuning of the antenna position is accomplished by slightly changing the direction of the antenna beam and measuring the strength of received RF signals.

If the master device or the slave device is moving with respect to each other, the desired direction of the antenna beam of the master device may change over time. If the antenna control unit in the direction-agile antenna system of the master device determines that the strength of received RF signals is getting weaker, it drives the antenna to slightly different positions in an attempt to increase the strength of received RF signals. If the wireless data link is lost, the antenna beam is scanned in all directions until an RF signal from the slave device is detected to restore the wireless data link. In mobile wireless communications, the antenna beam may be scanned either continuously or in small steps in different directions to maintain the wireless data link between the master and slave devices, which may have constantly changing angular positions with respect to each other.

The method of signal tracking in a wireless network is also applicable to embodiments in which at least some of the wireless communication devices in the network use electronically steered direction-agile antennas instead of mechanically steered antennas for wireless data links. Instead of generating motor drive signals to rotate the antenna, the direction of the antenna beam is switched by selectively applying RF power to the most properly oriented antenna elements.

In an embodiment, the direction of the antenna beam is changed by shifting the phases of RF signals transmitted by different antenna elements in a planar array using the principle of phased array radiation known to a person skilled in the art. Before a signal from the slave device is detected by the master device, RF power is applied to the antenna arrays on all surfaces of the antenna of the master device to radiate polling requests in all directions. Once a response by a slave device is detected, one of the antenna surfaces of the master device is selected to transmit RF signals in a selected direction at a desired power level. In a further embodiment, the power level of the transmitted RF signals is adjusted by activating only some of the antenna elements in the array while switching off other antenna elements.

Figure 10:
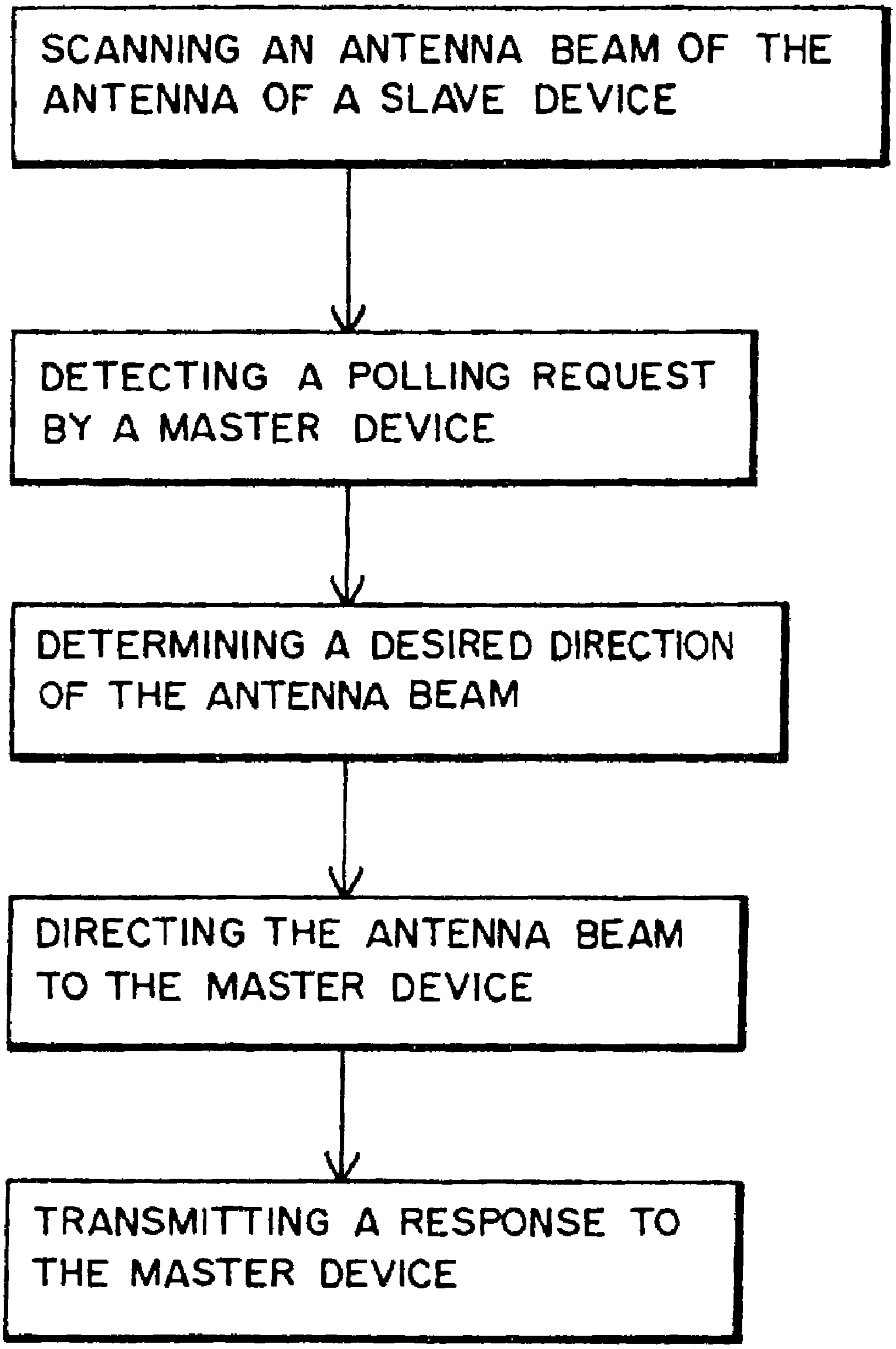
FIG. 10 is a flow chart illustrating a method of tracking a signal in a wireless network in an another embodiment according to the present invention.

FIG. 10 shows a flow chart of an embodiment of a method of tracking a signal within a wireless network by a slave device. The method generally comprises the steps of scanning the antenna beam of the slave device in multiple directions, detecting a polling request by the master device, determining a desired direction of the antenna beam to the master device, directing the antenna beam to the master device, and transmitting a response to the master device. In an embodiment, the desired direction of the antenna beam of the slave device is determined by detecting a beam pattern of an RF signal carrying the polling request by the master device and generating an antenna gain signal based upon the RF signal carrying the polling request. In an embodiment, the scanning and fine tuning of the antenna beam for the slave communication device is performed in a manner similar to that of the master device in a wireless network to establish and maintain a wireless data link.

Direction-agile antennas with electronic beam scanning typically have very fast switching times, for example, on the order of about 50 ns. These antennas can be implemented in wireless devices serving as access points in a wireless local area network (WLAN), for example. Mechanically steered antennas with a rotating speed of about 120 rotations per minute, for example, can be implemented in mobile devices with relatively small dimensions. The transmission and reception of polling requests and responses to establish handshakes between master and slave communication devices in a wireless network may be performed using an industry-standard protocol according to IEEE 802.11, for example. Other types of protocols may also be used for establishing wireless data links between different wireless devices using direction-agile antenna systems within the scope of the present invention.

The present invention has been described with respect to particular embodiments thereof, and numerous modifications can be made which are within the scope of the invention as set forth in the claims.

What is claimed is:

1. A system for use in establishing and maintaining wireless data links, the system comprising:

an antenna system capable of being selectively configured to transmit or receive an electromagnetic signal in a plurality of selected patterns; and a controller coupled to the antenna system and configured to transmit at least one polling request through the antenna system, detect one or more responses to the at least one polling request while the antenna system is configured in at least two different selected patterns, determine a selected pattern for the antenna system based on the responses to the polling request received while the antenna system is configured in the at least two different selected patterns and transmit a signal to the antenna system indicating the selected pattern for the antenna system.

2. The system of claim 1 wherein said antenna system comprises a plurality of elements and at least one of the plurality of elements is configured to transmit an electromagnetic signal in a different pattern than another of the elements.

3. The system of claim 2 wherein at least one of the elements is configured to be activated while other elements are switched off to transmit the electromagnetic signal in the selected pattern of transmission.

4. The system of claim 1, wherein the antenna system comprises a plurality of elements and the controller is further configured to transmit the polling requests from all of the elements.

5. The system of claim 1 wherein the controller is configured to transmit a first polling request while the antenna system is configured in a first selected pattern and to transmit a second polling request while the antenna system is configured in a second selected pattern.

6. The system of claim 1 wherein the controller comprises circuitry which is integrated with a surface on which at least one of the elements is disposed.

7. The system of claim 1 wherein the controller is further configured to transmit a signal to the antenna system to scan in multiple patterns and detect a response to the polling request during the scanning of the antenna system.

8. The system of claim 2 wherein at least some of the elements are arranged as a phased array.

9. The system of claim 1 wherein said controller is further configured to store the selected pattern for later communication with a device which transmitted the one or more responses to the at least one polling request.

10. A method of improving a wireless communication link using an antenna system having multiple patterns, the method comprising:

transmitting at least one request from the antenna system;

scanning the antenna system in multiple patterns;

detecting responses to the request while the antenna system is configured in at least two different selected patterns during the scanning;

determining a pattern of the antenna system based on the detected responses; and transmitting or receiving a signal from the antenna system in the determined pattern.

11. The method of claim 10 wherein the antenna system comprises a plurality of elements and said at least one request is transmitted from all of the antenna elements of the antenna system.

12. The method of claim 10 further comprising selecting a scanning speed for said antenna system which is different from the scanning speed of an additional antenna system in said communication link.

13. The method of claim 10 further comprising the step of changing patterns for said antenna system at a rate which is different from the rate at which patterns are changed by an additional antenna system in said communication link.

14. The method of claim 10 wherein patterns correspond to directions and scanning the antenna system in multiple patterns includes scanning in azimuth and elevation directions.

15. The method of claim 10 wherein determining a pattern of the antenna system comprises:

detecting a pattern of a signal carrying a response to the request by scanning of the antenna system.

16. The method of claim 10, wherein determining the pattern of the antenna system comprises:

comparing one or more characteristics of a signal carrying a response to the request detected at different times during the scanning.

17. The method of claim 10 further comprising:

monitoring characteristics of a signal received by the antenna system, determining if the characteristics meet predetermined criteria, and if the predetermined criteria are met, scanning the antenna system in multiple patterns.

18. The method of claim 10 further comprising:

monitoring characteristics of a signal received by the antenna system as the pattern of the antenna system is changed and adjusting the pattern of the antenna system based upon the monitoring of the characteristics.

19. The method of claim 10 further comprising:

if an expected signal is not received, scanning the antenna system in multiple patterns.

20. The method of claim 10 wherein the antenna system has a plurality of antenna elements and scanning the antenna system in multiple patterns comprises shifting the phases of signals received by different antenna elements of the antenna system.

21. The method of claim 20 wherein transmitting at least one request from the antenna system comprises transmitting a request from all of the antenna elements.

22. The method of claim 10 further comprising recording the determined pattern for later use.

23. The method of claim 10 wherein the request is a polling request and the responses are transmitted according to the I.E.E.E. 802.11 standard.

24. The method of claim 10 wherein the step of scanning the antenna system is carried out by first activating a first antenna element and reflector and then activating a second element and a reflector.

25. A method for use in establishing and maintaining wireless communications using an antenna system with the capability to transmit and receive signals in a direction having a positive antenna gain and to vary that, the method comprising:

- transmitting a communication from the antenna system;
- electronically steering the antenna gain of the antenna system through multiple directions;
- detecting a response signal to the communication while the antenna system is being steered through multiple directions;
- selecting the direction of the antenna gain based upon at least one characteristic of the response signal received at different directions of the antenna gain; and
- transmitting or receiving a signal from the antenna system in the selected direction.

26. A method of improving a wireless communication link using an antenna system with the capability to transmit and receive signals in more than one pattern, the method comprising:

- transmitting from a device one or more signals that expect a response;
- receiving one or more signals that expect a response at the antenna system from a device when the antenna system is configured in at least two different selected patterns;
- determining a pattern of the antenna system based on the received signals; and
- transmitting a response to the one or more signals that request a response in the determined pattern.

27. The method of claim 26 wherein the one or more signals that expect a response are requests for a data link.

28. The method of claim 26 wherein determining a direction for the gain of the antenna system comprises:

- detecting a beam pattern of the one or more signals that expect a response.

29. The method of claim 26, wherein determining a pattern of the antenna system comprises:

- comparing characteristics of the one or more signals that expect a response which were received when the antenna system was configured in at least two different selected patterns.

30. The method of claim 26 further comprising:

- monitoring characteristics of a signal received by the antenna system.

31. The method of claim 26 further comprising:

- monitoring characteristics of a signal received by the antenna system as the pattern of the antenna beam is changed.

32. The method of claim 26 wherein the antenna system has a plurality of antenna elements and configuring the antenna system in at least two different selected patterns comprises activating and switching off different antenna elements of the antenna system.

33. The method of claim 26 wherein the antenna system has a plurality of antenna elements and configuring the antenna system in at least two different selected patterns comprises shifting the phases of signals received by different antenna elements of the antenna system.

34. The method of claim 26 further comprising recording the determined direction for later use in communicating with the device.

35. An antenna system for use in establishing and maintaining wireless data links, the system comprising:

- an antenna having a plurality of antenna elements arranged for use as a phased array capable of selectively transmitting or receiving an electromagnetic signal in a plurality of patterns; and
- a controller coupled to the antenna and configured to
  - transmit polling requests through the antenna,
  - detect responses to the polling requests while the antenna is configured in at least two different selected patterns,
  - determine a selected pattern of the antenna for transmitting or receiving based on the responses to the polling requests,
  - transmit a signal to the antenna indicating the selected pattern of the antenna.

36. The system of claim 35 wherein the controller comprises circuitry which is integrated with a surface on which at least one of the elements is disposed.

37. The system of claim 35 wherein the controller is further configured to scan the antenna in multiple patterns and detect a beam pattern of a signal carrying a response to the polling requests over the scanning of the antenna.

38. An antenna system for use in establishing and maintaining wireless data links, the system comprising:

- an antenna system capable of selectively transmitting or receiving an electromagnetic signal in a plurality of directions; and
- a controller coupled to the antenna system and configured to
  - send a signal to the antenna system to cause it to orient its gain in multiple directions,
    - transmit polling requests through the antenna system,
    - detect responses to the polling requests while the antenna system is oriented in at least two different directions,
  - determine a selected direction for the orientation of the gain of the antenna system based on the responses received while the antenna system was oriented in at least two different directions, and
  - transmit a direction control signal to the antenna system indicating the selected direction for the orientation of the gain of the antenna system.

39. The system of claim 38 wherein said antenna system comprises a plurality of elements and at least one of the plurality of elements is configured to transmit an electromagnetic signal in a different direction than another of the elements.

40. The system of claim 39 wherein at least one of the elements is capable of being activated while other elements are switched off to transmit the electromagnetic signal in the selected direction of transmission of the antenna system.

* * * * *